(12) United States Patent
Nimri et al.

(10) Patent No.: US 6,744,460 B1
(45) Date of Patent: Jun. 1, 2004

(54) VIDEO DISPLAY MODE AUTOMATIC SWITCHING SYSTEM AND METHOD

(75) Inventors: Alain Nimri, Austin, TX (US); Michael Kenoyer, Austin, TX (US); David Hein, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 291 days.

(21) Appl. No.: 09/684,489

(22) Filed: Oct. 4, 2000

Related U.S. Application Data

(60) Provisional application No. 60/157,510, filed on Oct. 4, 1999.

(51) Int. Cl.[7] .................................................. H04N 7/14
(52) U.S. Cl. ................................ 348/14.11; 348/14.08; 348/14.07
(58) Field of Search ........................ 348/14.01–14.09, 348/14.1, 14.11–14.13, 14.16; 345/765, 781, 771; H04N 7/14

(56) References Cited

U.S. PATENT DOCUMENTS 5,315,633 A    5/1994   Champa
5,768,263 A    6/1998   Tischler et al.
5,959,667 A    9/1999   Maeng
5,991,277 A   11/1999   Maeng et al.
6,025,870 A    2/2000   Hardy

FOREIGN PATENT DOCUMENTS

JP   363003589 A   * 1/1988   ............ H04N/7/14
JP   410276236 A   * 10/1998  ............ H04L/29/04

* cited by examiner

*Primary Examiner*—Melur Ramakrishnaiah
(74) *Attorney, Agent, or Firm*—Wong, Cabello, Lutsch, Rutherford & Brucculeri LLP

(57) ABSTRACT

An automatic switching system and method for determining and effecting an optimal video display mode based on the interaction among participants in a conference or discussion is disclosed. The system includes a timer which continuously monitors the duration of signals received from each of a number of endpoints. The system further includes a signal switching processor which compares the signal durations to predefined parameters which define various display mode switching thresholds. The system reacts to the conversational interaction of endpoint participants by automatically switching the display mode of all endpoints between single-window, single speaker presentation mode, and multiple-window, multiple speaker discussion mode.

19 Claims, 6 Drawing Sheets

VIDEO DISPLAY MODE AUTOMATIC SWITCHING SYSTEM AND METHOD

CROSS-REFERENCE TO RELATED APPLICATIONS

This application claims priority from commonly owned U.S. patent application Ser. No. 60/157,510, filed on Oct. 4, 1999. Furthermore, this application is related to and incorporates by reference commonly owned U.S. patent application Ser. No. 09/417,903 entitled "Conferencing System Having An Embedded Web Server and Methods of Use Thereof", filed on Oct. 14, 1999; U.S. patent application Ser. No. 60/157,711 entitled "Videoconferencing Apparatus Having Integrated Multi-Point Conference Capabilities", filed on Oct. 5, 1999; and U.S. Pat. No. 5,900,907 entitled "Integrated Videoconferencing Unit", issued May 4, 1999.

BACKGROUND OF THE INVENTION

1. Field of the Invention

The present invention relates generally to video communications systems, and more particularly to a display mode automatic switching system for use with video displays in multi-participant conference systems.

2. Background of the Prior Art

During multi-point videoconferences (those involving three or more conference endpoints), two viewing modes are commonly utilized. In a first mode, called the discussion or continuous presence mode, images of all conference endpoints are displayed simultaneously, each image occupying a separate window. The discussion mode is particularly useful in situations where there is frequent interaction between the conference participants. In a second mode, the image of the endpoint corresponding to the currently speaking participant is displayed full screen at the other endpoints. The full-screen or presentation mode is useful where one conference participant is speaking for an extended period of time.

Some multi-point videoconferences are facilitated through a conference service provider. Conference participants dial into a multi-point control unit provided by the service provider, where the audio, video, and data from the participating endpoints is received, processed, and transmitted to the participating endpoints. In some prior art systems, either a voice-activated video bridge or a continuous presence video bridge is utilized, whereby the chosen viewing mode (presentation mode or discussion mode, respectively) is static throughout the duration of the videoconference. The inherent limitations of a static viewing mode configuration result in a less than optimum conference.

Other prior art systems provide display mode switching capability, wherein switching between the two modes is generally performed by a video processor (typically located at a multi-point control unit) under the manual control of one of the conference participants. However, the need to manually switch between the two modes is distracting and may interrupt the natural flow of communication, again resulting in a diminished conference. In addition, during a multi-party television program production, a production crew typically performs manual switching of display modes during a live interview or discussion.

Therefore, there is a need in the arts to provide a display mode automatic switching system capable of reacting to the interaction of multiple conference participants and managing the video display modes of all conference participants accordingly.

SUMMARY

An automatic switching system and method for determining and effecting an optimal video display mode based on the interaction among participants in a conference or discussion is described. Typically, available display modes for a video display device include a discussion mode wherein images from all endpoints are presented simultaneously in separate windows, and a presentation mode wherein images from a single endpoint are presented in a single window. Preferred operating environments of the system and method described herein include multi-point videoconferencing and live television program production.

The system includes a timer which continuously monitors the duration of signals received from each of a number of endpoints. The system further includes a signal switching processor which compares the signal durations to predefined parameters which describe various display mode switching thresholds. The system reacts to the conversational interaction of endpoint participants by automatically transmitting a mode switching command to a video switching processor, thereby effecting the changing of the display mode of all endpoints between a single speaker presentation mode and a multiple speaker discussion mode. The system is automatic in that the switching occurs without any active input from the participants other than their conversational participation.

In preferred embodiments, the automatic switching system reacts to the conversation occurring among the endpoint participants by monitoring the duration of the audio portion of multiplexed audio/video signals received from each of multiple endpoints. In general, a presentation display mode is considered optimal when a speaker from one of the multiple endpoints is the sole, or distinct, speaker. A distinct speaker is defined as a speaker whose speaking duration exceeds a predefined threshold. A discussion display mode is considered optimal when no speakers at any of the endpoints are exceeding a predefined "cough delay" threshold, thus eliminating unnecessary and distracting display mode switching. Additionally, the discussion display mode is considered optimal when at least one speaker at more than one endpoint is speaking for a duration exceeding the cough delay.

DETAILED DESCRIPTION OF PREFERRED EMBODIMENTS

Figure 1A:
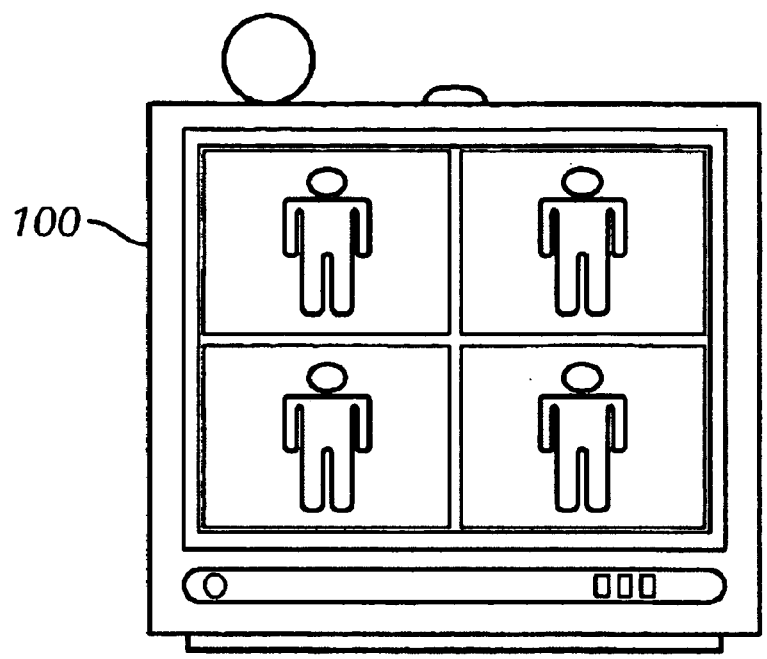
FIG. 1A depicts an exemplary discussion display mode in accordance with an embodiment of the invention, wherein images from four endpoints are presented simultaneously in separate windows.
Figure 1B:
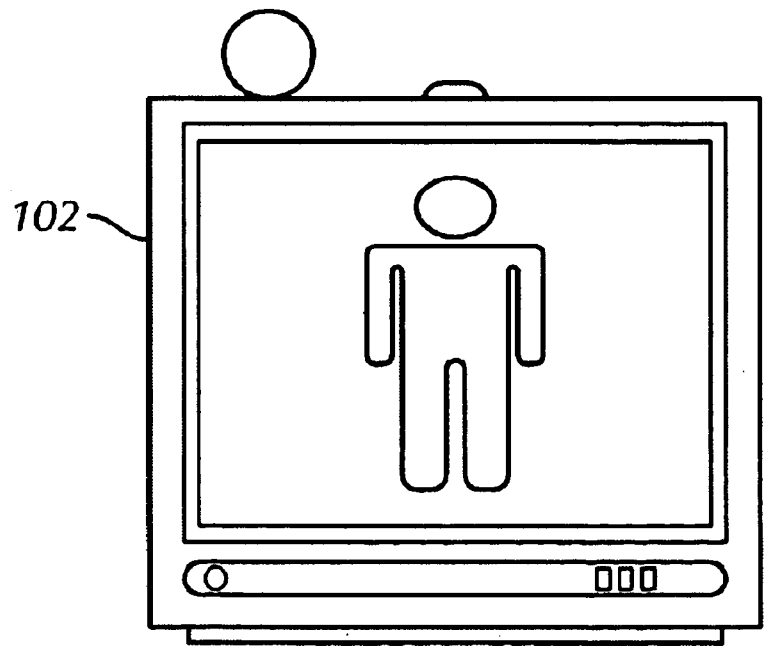
FIG. 1B depicts an exemplary presentation display mode in accordance with an embodiment of the invention, wherein images from a single endpoint are presented in a single window.

Reference is directed to FIG. 1A and FIG. 1B, which depict two typical video display modes available in a multi-point communication system. FIG. 1A depicts an exemplary discussion display mode 100, wherein images of four participating endpoints are presented simultaneously in separate windows. The discussion display mode 100 is not limited to a four-window configuration as depicted, but may be configured to display a variable number of windows in various window shapes and sizes. In addition, not all endpoints are necessarily represented in a discussion display mode 100. FIG. 1B depicts an exemplary presentation display mode 102, wherein a single endpoint is presented in a single window. The present invention is directed to a system that automatically determines and facilitates an optimal display mode, selected preferably from but not limited to discussion mode 100 and presentation mode 102, based on the interactivity amongst the participants at multiple endpoints.

Figure 2:
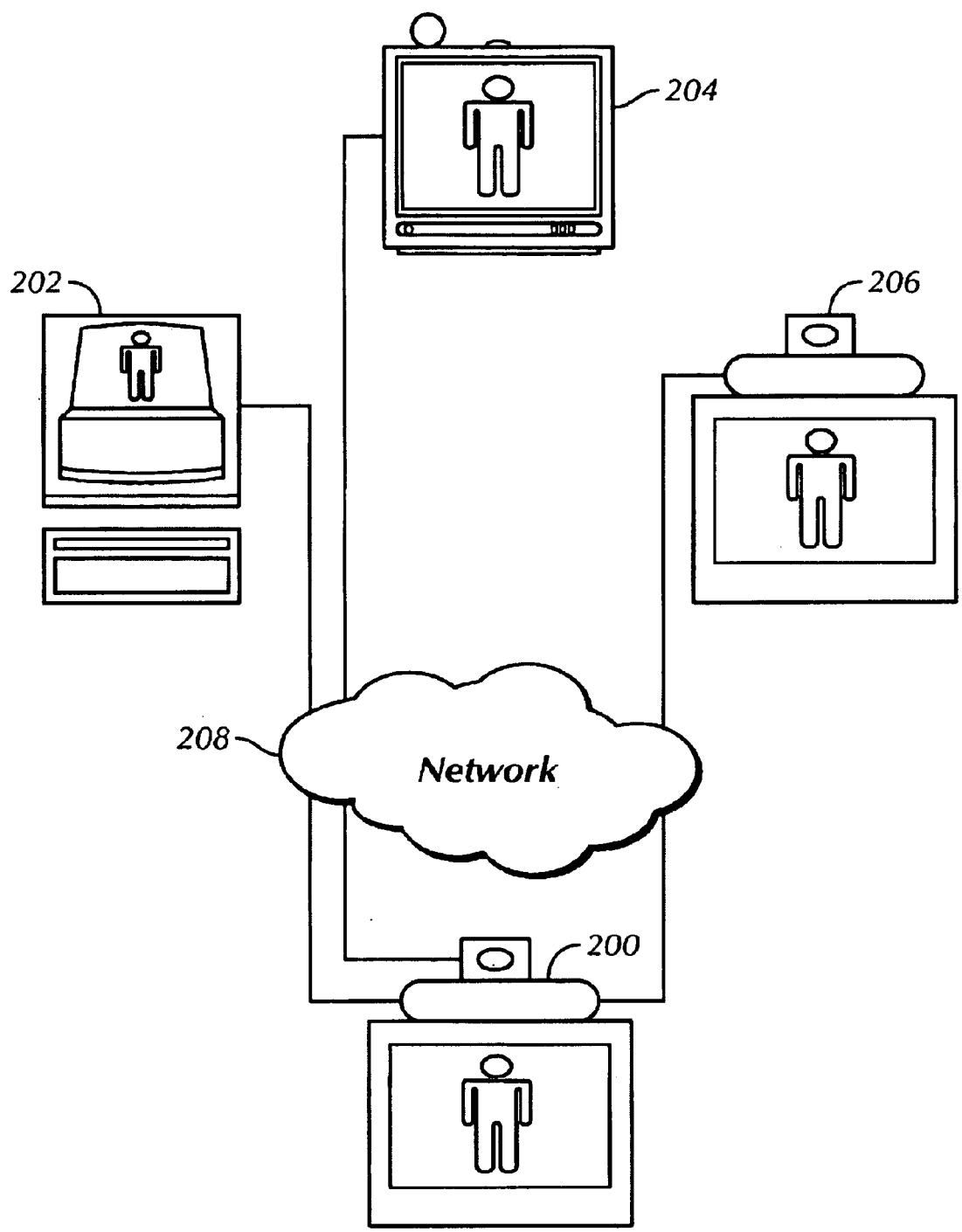
FIG. 2 depicts an exemplary operating environment of the video display mode automatic switching system of the present invention.

FIG. 2 depicts an exemplary operating environment of a video display mode automatic switching system of the present invention. Describing the invention in an exemplary multi-point videoconferencing environment, a near conference endpoint 200, embodying the features of the switching system, is coupled to multiple remote conference endpoints 202, 204 and 206 via a network 208. The remote conference endpoints 202, 204, and 206 may comprise a combination of dissimilar communication devices with audio/video capability, for example, ViewStation™ MP devices provided by Polycom, Inc. of Milpitas, Calif., personal computers executing a conferencing application, enhanced television equipment, and the like. It should be appreciated that while only three remote conference endpoints are depicted in FIG. 2 for the purpose of clarity, a greater number of remote conference endpoints may be coupled to the network 208 and accommodated by near conference endpoint 200.

The network 208 may be of any type suitable for the transmission of audio and video data between near conference endpoint 200 and remote conference endpoints 202, 204 and 206. Network 208 may comprise a circuit switched network such as the public switched telephone network (PSTN), utilizing digital transmission technology such as the H.320 series of standards for Integrated Services Digital Networks (ISDN). Alternatively, network 208 may comprise a packet switched IP-based network such as a local area network (LAN) utilizing, for example, Ethernet technology, or a wide area network (WAN) such as the Internet. Devices communicating through an IP-based network employ an appropriate communication standard such as the H.323 standard and an appropriate protocol such as Transmission Control Protocol/Internet Protocol (TCP/IP). Although a single network 208 is shown, it is contemplated that the invention may be practiced through the use of two or more network types (for example, the PSTN and the Internet) to connect conference endpoints utilizing different communication protocols.

For exemplary purposes, the technology is described herein primarily in relation to videoconferencing systems. This description is not intended to limit practice of the invention to such a system or operating environment. Those skilled in the art will appreciate that the invention may be practiced in any number of multi-party environments utilizing video displays. Thus, for a non-limiting example, use of the present technology with live television program production is also contemplated.

Figure 3:
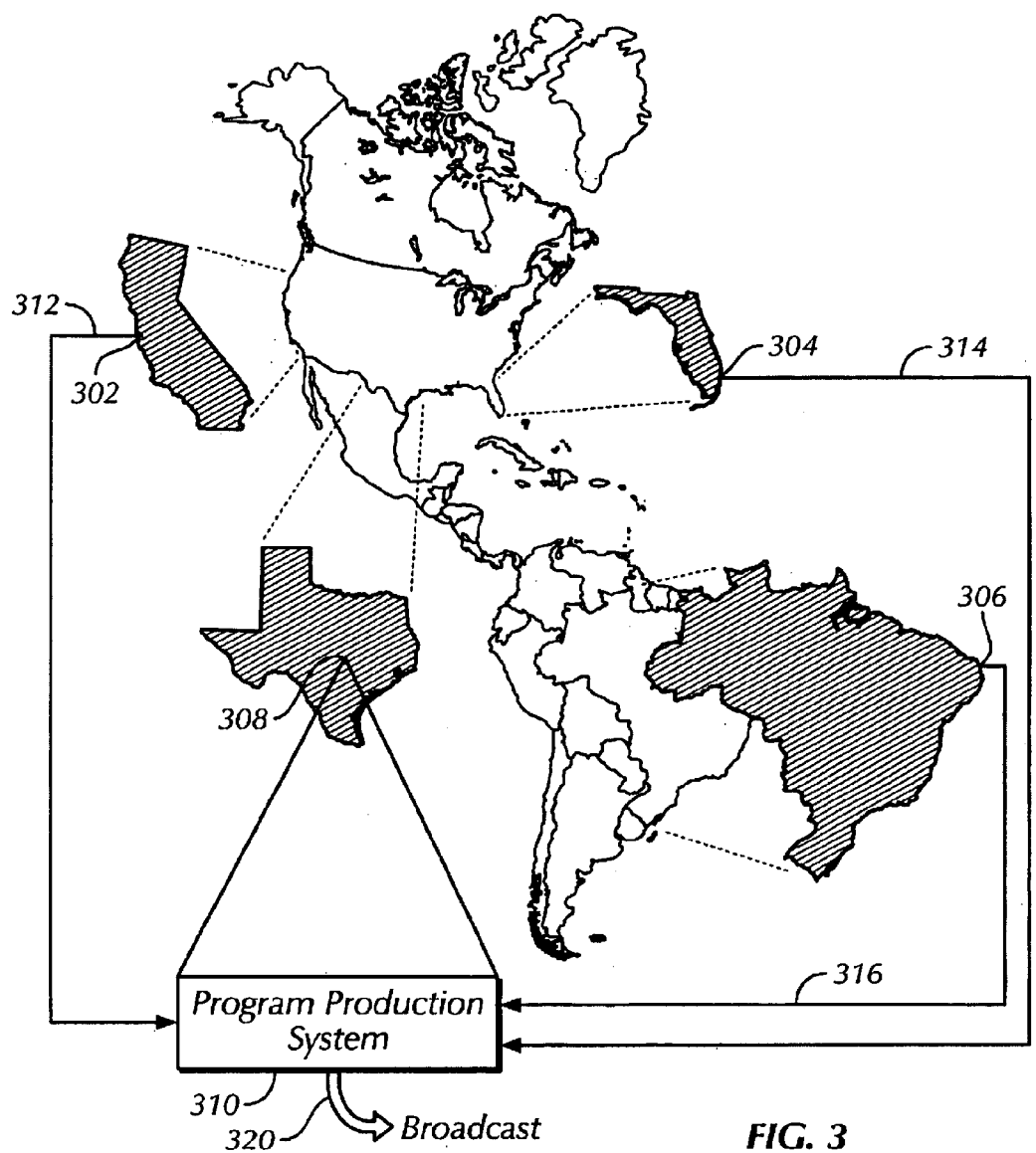
FIG. 3 depicts another exemplary operating environment of a video display mode automatic switching system of the present invention.

FIG. 3 depicts another exemplary operating environment of a video display mode automatic switching system. The exemplary environment depicted includes multiple endpoints 302, 304, and 306 located in various parts of the world, which may transmit audio/video feeds 312, 314, and 316, respectively, to a central endpoint 308 via any suitable transmission technology known in the art, such as a satellite communication system. The central endpoint 308 may be a live television program production unit which is producing and broadcasting a program based on multi-point communication, for example, a multi-participant interview or discussion. The automatic switching system of the present invention may be embodied in a program production system 310 located at central endpoint 308. Thus, the optimal display mode, such as discussion mode 100 (FIG. 1) or presentation mode 102 (FIG. 1), for various portions of the broadcast 320, is determined by the automatic switching system of the program production system 310.

Figure 4:
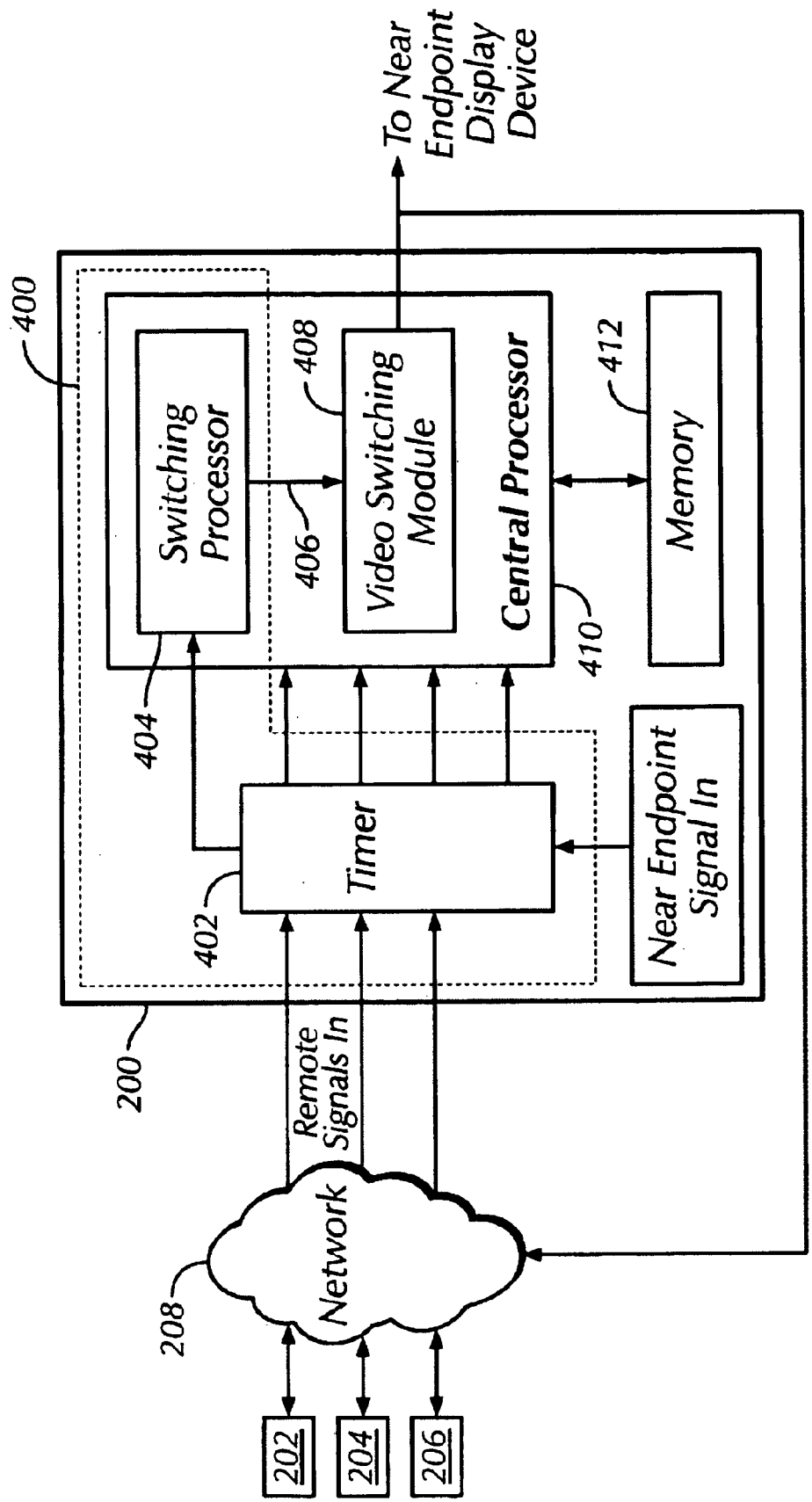
FIG. 4 depicts a video display mode automatic switching system, in accordance with an embodiment of the invention, operating in an exemplary environment as depicted in FIG. 2.

FIG. 4 depicts the automatic switching system 400 of the present invention, operating in exemplary near endpoint 200 of the exemplary environment as depicted in FIG. 2. In describing the switching system 400, near endpoint 200 is considered the conference controller and thus controls the display mode of the participating endpoints. An alternative configuration is capable of allowing each endpoint to control its own video display mode through operation of the switching system 400 at each of the endpoints. It is to be appreciated that the automatic switching system 400 of the present invention may be implemented in a conventional multi-point control unit (MCU), or in a videoconferencing apparatus having multi-point capabilities.

The switching system 400 receives signals from the near endpoint 200 (FIG. 2) audio/video capture devices (i.e., microphone and video camera, not shown) and from each of the remote endpoints 202, 204, and 206 (FIG. 2) through the network 208 (FIG. 2), at a timer 402. The received signals describe the audio and video captured from each of the endpoints 200, 202, 204, and 206, which represent the speech (audio) and physical interaction (video) of the participants located at the endpoints 200, 202, 204, and 206. The signals received at timer 402 may be composite, or multiplexed, audio/video signals or may be audio-only signals that were decomposed from multiplexed audio/video signals. Regardless of the form of the received signal, the timer 402 continuously monitors the duration of the audio portion of each of the received signals.

The automatic switching system 400 further comprises a switching processor 404, which is a sub-component of a central processor 410 of near endpoint 200 (FIG. 2). The central processor 410 further comprises a video switching module 408, as well as other modules and associated processing routines that are not depicted in FIG. 4. Near endpoint 200 is further provided with a memory 412, which may be one or a combination of conventional RAM and/or ROM. The memory 412 provides storage capability for various raw and processed data that may be accessed by the switching system 400 during its operation.

In operation, the timer 402 transmits signal duration data to the switching processor 404. The switching system 400 is functional in more than one manner. In one embodiment, the transmission of duration data from the timer 402 to the switching processor 404 occurs continuously whereby the switching processor 404 compares the ongoing duration of each audio signal with predefined parameters. In another embodiment, the transmission of duration data may occur when certain predefined parameters, or thresholds, are equaled or exceeded. In both embodiments, the switching processor 404 utilizes the signal duration data, in comparison with the predefined parameters, to determine an optimal video display mode based on the current interaction occurring among the participants at endpoints 200, 202, 204, and 206 (FIG. 2). In a commercial embodiment of the automatic switching system 400, the predefined signal parameters are hard-coded in the switching processor logic and thus inaccessible for modification by the user. It is contemplated that alternate embodiments may offer the user the capability to modify these parameters to suit specific needs. For example, modification of parameters may be enacted through a user interface menu (not shown) and subsequently stored in memory 412.

Upon determining the optimal display mode, preferably selected from the discussion mode 100 (FIG. 1) and the presentation mode 102 (FIG. 1), the switching processor 404 generates a video display mode command signal 406 in accordance with the switching method described herein. In the case where the switching system 400 is operating in a videoconferencing environment as exemplified in FIG. 2, the command signal 406 is transmitted to the video switching module 408 for effecting the appropriate display mode for display devices located at each of the near and remote endpoints 200, 202, 204, and 206 (FIG. 2). Typically, the display devices are coupled to each of the Videoconferencing devices at endpoints 200, 202, 204, and 206.

In the case where the switching system 400 is operating in a program production environment as exemplified in FIG. 3, the automatic switching system 400 operates with a video switching module 408 to effect the display mode embedded in the broadcast signal 320 (FIG. 3). In this environment, the signal 320 may be transmitted in real time, i.e., the program is broadcast "live" to end viewers, or the signal 320 may be saved for future broadcast to end viewers. In either case, the switching system 400 operates according to the interaction between the persons participating in the discourse.

Figure 5:
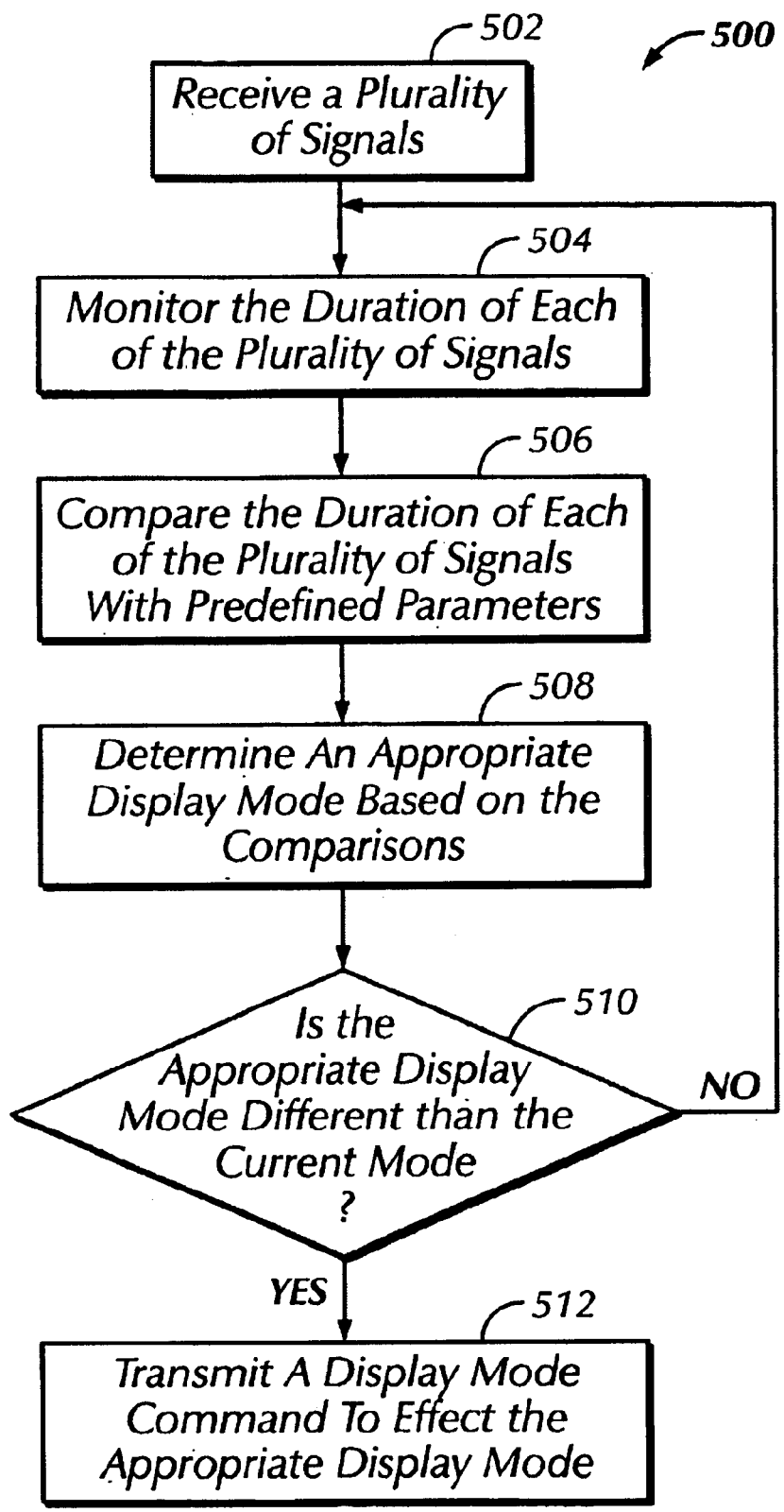
FIG. 5 is a flowchart depicting a method of automatically determining and switching a display mode of a video display device, according to the present invention.

FIG. 5 is a flowchart depicting a method 500 of automatically determining and switching a display mode of a video display device, according to the present invention. At step 502, the system receives a signal from each of multiple endpoints, e.g., endpoints 200, 202, 204, and 206 of FIG. 2 or endpoints 302, 304, and 306 of FIG. 3. The duration of the signals from each of the endpoints are continuously monitored by the timer 402 (FIG. 4) at step 504. At step 506, the duration of each of the monitored signals are compared to predefined parameters by the switching processor 404 (FIG. 4) so that an appropriate display mode can be determined according to the comparisons, at step 508. The predefined parameters are exemplified and discussed in reference to FIG. 6.

In general, a presentation display mode 102 is considered optimal when a speaker from one of the endpoints (near or remote) is the sole speaker, with a duration of speech exceeding a parameter $t_2$. A discussion display mode 100 is considered optimal when any of the following conditions are present:

(1) no participants at any of the endpoints are speaking, and thus none of the durations of speech exceed a parameter $t_0$;

(2) no participants at any of the endpoints are speaking for a duration exceeding a "cough delay" defined by a parameter $t_1$; and (3) at least one participant at more than one endpoint is speaking for a duration exceeding the parameter $t_1$.

Returning attention to step 510 of FIG. 5, the appropriate display mode determined at step 508 is compared to the current display mode of the majority of display devices at endpoints 200, 202, 204, and 206 (FIG. 2) or 302, 304, and 306 (FIG. 3). In one embodiment each endpoint is essentially always displaying the same display mode. In another embodiment, when a distinct speaker exists, all non-distinct endpoints display a presentation display mode showing the distinct endpoint while the distinct endpoint displays a discussion display mode. If the appropriate display mode is different than the current majority display mode, then at step 512 a command 406 (FIG. 4) is transmitted by the switching processor 404 (FIG. 4) to a video switching module 408 (FIG. 4). The command directs the video switching module 408 to operate with the associated processing routines and audio/video signals to effect a video display mode according to the appropriate display mode determination. If the appropriate display mode is the same as the current majority display mode, then the switching system 400 (FIG. 4) returns to step 504 to continue monitoring the duration of the signals received from each of the endpoints 200, 202, 204, and 206 or 302, 304, and 306.

Figure 6:
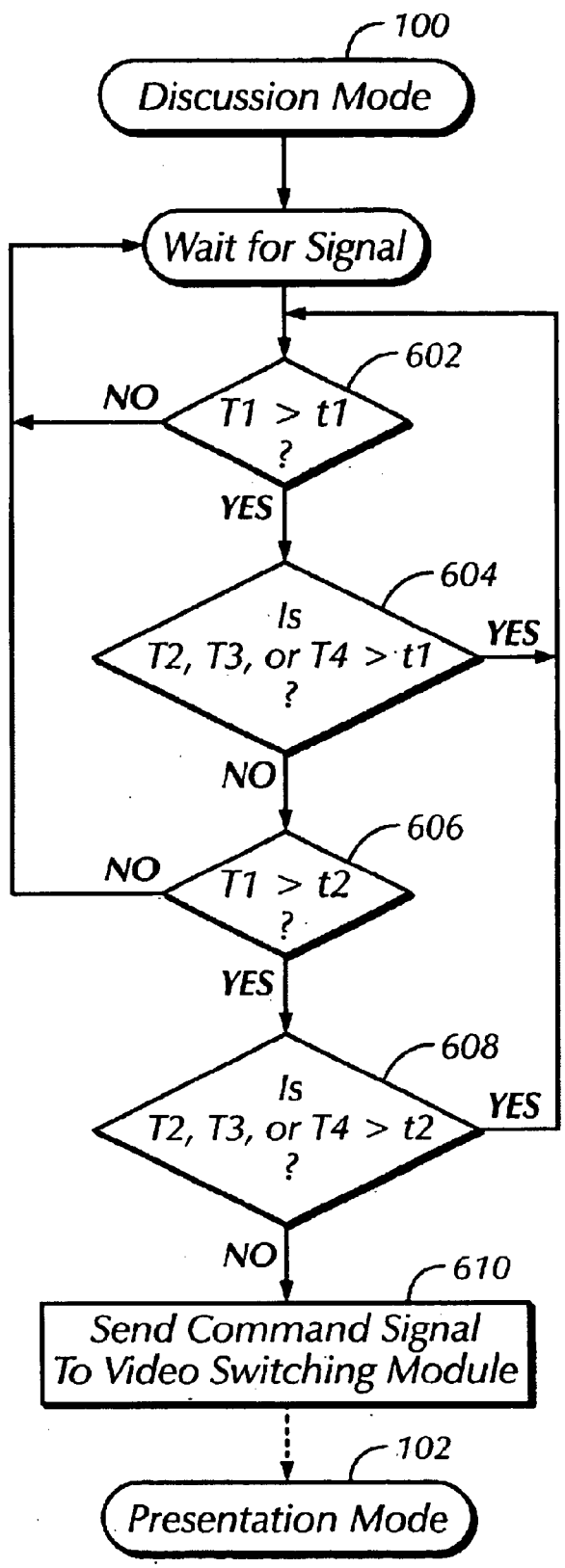
FIG. 6 depicts a flowchart of a method for comparing signal durations to switch from a discussion display mode to a presentation display mode, in accordance with an embodiment of the invention.

FIG. 6 depicts a flowchart of a method for comparing signal durations to determine if a switch from a discussion mode 100 to a presentation mode 102 is required, generally exemplifying step 506 of FIG. 5. The flowchart is based on the premise that the current display mode is the discussion mode 100. The logic flow based on a single endpoint audio signal (e.g., near endpoint 200 of FIG. 2) with a time duration of $T_1$ is shown. Similar logic flow is applicable to the other endpoints (e.g., remote endpoints 202, 204, and 206 of FIG. 2, and 302, 304, and 306 of FIG. 3) and their respective audio signal durations $T_2$, $T_3$ and $T_4$. As indicated, the switching processor 404 (FIG. 4) continuously compares the signal duration data received from timer 402 (FIG. 4) to predefined parameters of increasing duration along a time continuum.

At step 602, it is determined whether T1 exceeds $t_1$, the "cough delay." If it does not, then the method includes a loop back to the beginning where the timer 402 waits for another signal T1 from the same endpoint. If T1 does exceed the $t_1$ threshold, then the switching processor 404 determines whether any of the signals T2–T4 from the other endpoints also exceed the $t_1$ threshold, step 604. Note that the method depicted in FIG. 6 occurs for each of the participating endpoint signals. If any of the other signals exceed $t_1$, then none of the speakers are "distinct speakers." Therefore, the discussion mode is maintained and the method loops back to the beginning to wait for new audio signals or wait for a distinct speaker situation in which only one endpoint has a speaker exceeding the second threshold $t_2$. If none of the other signals exceed $t_1$, the timer 402 continues to time T1 to determine whether T1 exceeds the distinct speaker threshold $t_2$, step 606.

If the signal duration T1 does not exceed $t_2$, this speaker is still not a distinct speaker, therefore the method loops back to the beginning to wait for a new signal from the associated endpoint. If T1 does exceed $t_2$ at step 606, then the switching processor 404 determines whether any of the other signals T2–T4 also exceed this threshold, step 608. If any of the other signals also exceed $t_2$, then again, none of the speakers are distinct speakers. Therefore, the discussion mode is maintained and the method loops back to the beginning to wait for new audio signals or wait for a distinct speaker situation in which only one endpoint has a speaker exceeding the second threshold $t_2$. However, if none of the other signals exceed $t_2$, the switching processor 404 sends a command signal 406 (FIG. 4) to the video switching module 408 (FIG. 4) directing a presentation display mode 102 (FIG. 1) for all endpoint display devices. The presentation mode 102 will display the video being captured at the endpoint that has the distinct speaker exceeding parameter $t_2$, i.e., the $T_1$ endpoint in this example.

Upon directing a switch to presentation display mode 102, the timer 402 and the switching processor 404 of the automatic switching system 400 continue to function as described. Once a speaker from another endpoint exceeds the $t_1$ threshold, or once no speakers exceed the $t_2$ threshold, or once all speakers stop talking, the switching processor 404 will send a command signal 406 directing the video switching module 408 to return to the discussion display mode 100. This method continues throughout the operation of the switching system 400 (FIG. 4), thus automatically switching between display modes by monitoring and reacting to the conference participant interaction, without any active input from any of the participants other than their participation as speakers in the conference or discussion.

For a non-limiting example, a set of parameters may be defined as follows:

T=duration of a signal from an endpoint;

$t_0$=0 seconds;

$t_1$=2 seconds; and $t_2$=15 seconds.

As discussed, $t_1$ is termed the "cough delay" threshold and $t_2$ is defined as the "distinct speaker" threshold. The purpose of the cough delay is to squelch the switching operation in situations where such an operation would be unnecessary and distracting to conference participants. It provides for momentary interruptions of the distinct speaker which often occur in real-life discussions and videoconferences, such as when a speaker coughs or verbally reacts to another speaker's statement, without enacting a display mode switch. Therefore, if speakers comment or react to statements with an utterance of their own, the display mode will not change unless their comment exceeds the predefined parameter $t_1$. The preceding examples of predefined parameters are not intended to limit practice of the invention, but are presented for exemplary purposes to describe the present technology.

Although the preceding discloses an embodiment of a video display mode automatic switching system practiced in a multi-point videoconferencing environment and a television program production environment, it is not the intent of Applicants to limit the invention to such. Those skilled in the art may recognize that the invention can also be practiced in other multiple party audio/video production environments, whereby the invention disclosed and claimed herein would serve as the automatic switching system, thus foregoing the need for manual switching activities. In addition, although the preceding teaches use of audio signals representing human speech as the monitored signal, it is again not the intent of the Applicants to thereby limit practice of the invention. Furthermore, the invention is not limited to the specifics of the algorithm described, for those skilled in the art may recognize that other algorithms or enhancements to the described algorithm may be used to control the display mode. Therefore, these and other variations upon the preferred embodiments are intended to be covered by the present invention, which is limited only by the appended claims.

What is claimed is:

1. A switching system for automatically determining a display mode for a video display device comprising:

a timer, configured to monitor a duration of each of a plurality of signals, the signals being from a source at each of multiple endpoints; and a switching processor coupled to the timer and to a video switching module, configured to determine an appropriate display mode from the available display modes, wherein available display modes are single-window display and multiple-window display, based upon a comparison of the duration of each of the signals with at least one predefined parameter.

2. A switching system for automatically determining a display mode for a video display device, wherein available display modes are single-window display and multiple-window display, comprising:

a timer, configured to monitor a duration of each of a plurality of signals, the signals being from a source at each of multiple endpoints; and a switching processor coupled to the timer and to a video switching module, configured to determine an appropriate display mode to the available display modes based upon a comparison of the duration of each of the signals with at least one predefined parameter;

whereupon a determination that the appropriate display mode is different than the current display mode the switching processor transmits to the video switching module a display mode command, the display mode command being chosen from a single-window display command to effect the single-window display and a multiple-window display command to effect the multiple-window display.

3. The system of claim 2:

whereupon the signal duration from each of the endpoint does not exceed a predefined parameter $t_1$, the switching processor operates with the video switching module to effect the multiple-window display.

4. The system of claim 2:

whereupon the signal duration from one of the multiple endpoints exceeds a predefined parameter $t_2$ being greater than a predefined parameter $t_1$, and whereupon none of the signals received from each of the other endpoints exceeds $t_1$, the switching processor operates with the video switching module to effect the single-window display to display video images originating from the source of the signal that exceeds $t_2$.

5. The system of claim 2:

whereupon at least two of the signals received from the endpoints exceed a predefined parameter $t_1$ the switching processor operates with the video switching module to effect the multiple-window display.

6. The system of claim 2, wherein the display device is coupled to a multi-point videoconferencing device or application.

7. The system of claim 2, wherein the signal comprises an audio signal representing human speech.

8. The system of claim 2, wherein the switching processor effects the display mode of a display device located at each of the multiple endpoints.

9. A method for automatically determining a display mode for a display device comprising the steps of:

(a) receiving a signal from each of multiple endpoints;

(b) monitoring a duration of the signal from each of the multiple endpoints;

(c) comparing the duration of the signal from each of the multiple endpoints with predefined parameters; and (d) determining an optimal display mode from the available display modes, wherein available display modes are single-window display and multiple-window display, based on step (c).

10. The method of claim 9, wherein the signal from each of the multiple endpoints comprises a signal representing speech originating from the respective endpoints.

11. A method for automatically determining a display mode for a display device comprising the steps of:

(a) receiving a signal from each of multiple endpoints;

(b) monitoring a duration of the signal from each of the multiple endpoints;

(c) comparing the duration of the signal from each of the multiple endpoints with predefined parameters; and (d) determining an optimal display mode from the available display modes, wherein available display modes are single-window display and multiple-window display, based on step (c);

(e) whereupon the optimal display mode is different than a current display mode of the display device, transmitting a display mode command signal based on a determination in step (d), the display mode command signal effecting the display mode of the display device; and wherein step (e) comprises a command signal to effect the multiple-window display upon the duration from each of the multiple endpoints not exceeding a predefined parameter $t_1$.

12. The method of claim 11, wherein step (e) comprises a command signal to effect the single-window display to display video images originating from one of the multiple endpoints from which the duration exceeds a predefined parameter $t_2$ and upon none of the durations from each of the other multiple endpoints exceeds the predefined parameter $t_1$.

13. The method of claim 11, wherein step (e) comprises a command signal to effect the multiple-window display upon the durations from at least two of the multiple endpoints exceeding a predefined parameter $t_1$.

14. The method of claim 11, wherein the display device is coupled to a videoconferencing device or application.

15. The method of claim 14, wherein the signal from each of the multiple endpoints is transmitted from the videoconferencing application.

16. The method of claim 11, wherein the display mode command effects the display mode of a display device located at each of the multiple endpoints.

17. The method of claim 11, wherein the display mode command signal is transmitted to each of the multiple endpoints, and wherein the signal received from each of the multiple endpoints and the display mode command signal are transmitted utilizing H.320 series of communication standards for Integrated Services Digital Networks.

18. The method of claim 11, wherein the display mode command signal is transmitted to each of the multiple endpoints, and wherein the signal received from each of the multiple endpoints and the display mode command signal are transmitted utilizing H.323 standard for Internet Protocol-based networks.

19. A machine-readable medium having embodied thereon a program, the program being executable by a machine to perform method steps for changing a display mode of a video display device, the method steps comprising:

receiving a signal from each of multiple endpoints;

monitoring a duration of the signal from each of the multiple endpoints;

comparing the duration of the signal from each of the multiple endpoints with predefined parameters;

determining a desired display mode for the video display from available display modes based on the comparing step, the available display modes being a single window display and a multiple-window display, and upon the desired display mode being different than a current display mode of the video display device, transmitting a display mode command signal based on the determining step, the display mode command signal effect the desired display mode.

* * * * *